United States Patent [19]
Akiyama

[11] Patent Number: 5,626,706
[45] Date of Patent: May 6, 1997

[54] METHOD AND APPARATUS FOR PREPARING STRIP MATERIAL

[75] Inventor: Naruhiro Akiyama, Kodaira, Japan

[73] Assignee: Bridgestone Corporation, Tokyo, Japan

[21] Appl. No.: 558,178

[22] Filed: Nov. 15, 1995

[30] Foreign Application Priority Data

Dec. 27, 1994 [JP] Japan .................................. 6-337892

[51] Int. Cl.⁶ ........................................................ B29D 30/30
[52] U.S. Cl. ...................... 156/324; 156/123; 156/406.4; 156/543
[58] Field of Search ........................... 156/406.4, 405.1, 156/406, 324, 543, 554, 123, 516, 519, 522, 906, 907

[56] References Cited

U.S. PATENT DOCUMENTS

| | | | |
|---|---|---|---|
| 3,413,174 | 11/1968 | Porter | 156/405.1 |
| 3,479,238 | 11/1969 | Kehoe et al. | 156/405.1 |
| 3,898,116 | 8/1975 | Katagiri et al. | 156/406 |
| 4,824,515 | 4/1989 | Still et al. | 156/406.4 |
| 4,903,372 | 2/1990 | Mick, Jr. et al. | 156/406.4 |
| 5,059,274 | 10/1991 | Kumagai | 156/406.4 |

FOREIGN PATENT DOCUMENTS 63-78736  4/1988  Japan .

Primary Examiner—Geoffrey L. Knable
Attorney, Agent, or Firm—Jones, Day, Reavis & Pogue

[57] ABSTRACT

A method and an apparatus are disclosed which are simplified in their constitution and capable of forming a strip material 58 that is inexpensive and yet of high quality by joining one on the other first and second strips 25, 41 shifted from each other in the lengthwise direction. During the joining the second strip 41 with the first strip 25, the second strip 41 is pulled by the transfer conveyor 11 and thereby drawn from the supporting means 42 and then fed to the transfer conveyor 11, and by virtue of this, the feed rate of the second strip 41 is identical to the traveling speed of the transfer conveyor 11 (the transfer speed of the first strip 25), thus leading to enhanced quality of the resulting strip material 58. In addition, since the transfer means 51 and the transfer conveyor 11 are required to be controlled only in timing of actuation, a controlling means therefor may be simple.

3 Claims, 3 Drawing Sheets

METHOD AND APPARATUS FOR PREPARING STRIP MATERIAL

BACKGROUND OF THE INVENTION

1. Field of the Invention

The present invention relates to a method for preparing a strip material by joining two strips one on the other with the strips shifted each other in the lengthwise direction, and an apparatus for the same.

2. Description of the Prior Art

As a conventional apparatus for preparing a strip material, for example, there has been known one disclosed in Japanese Patent Unexamined Publication No.078736/1988. This apparatus comprises a first conveyor extending in the longitudinal direction and capable of transferring a first strip forward while supporting the first strip from the lower side, a second conveyor located directly above the first conveyor and extending in the longitudinal direction and capable of transferring a second strip forward while supporting the second strip from the lower side, and a controlling means for joining the first and second strips one on the other to form a strip material with the strips shifted each other in the lengthwise direction by a predetermined amount by controlling operations of the first and second conveyors separately or synchronously. To form a strip material by means of such an apparatus, only the second conveyor is first actuated to transfer the second strip forward, and when the forward end of the second strip is transferred to a predetermined position, the first conveyor is caused to travel by the controlling means at the same speed and in the same direction as the second conveyor. Thus, the second strip and the first strip meet together at a joining position on the first conveyor with the strips shifted each other in the lengthwise direction by a predetermined amount and they are joined at the joining position one on the other to form a strip material.

In such a conventional method or apparatus for preparing a strip material, however, the feed rates of the first and second strips are straightforwardly determined by the traveling speeds of the first and second conveyors, respectively. Accordingly, if inequality is caused between the first and second conveyors in traveling speed even in an extremely slight degree, the second strip is joined with the first strip while being tensed or contracted. As a result, excess or shortage is caused in the length of the second strip at the time of completion of the joining, leading to a problem that quality of the resulting strip material is impaired. Further, it is required, on one hand, for providing the shift to cause the first and second conveyors to travel separately, and on the other hand, for joining the strips one on the other to cause the first and second conveyors to travel simultaneously at the same speed in the same direction. Accordingly, a special control device is required for controlling the travels of the first and second conveyors, thereby causing problems of complicated constitution and diseconomy.

SUMMARY OF THE INVENTION

It is an object of the present invention to provide a method for preparing a strip material, which has a simple constitution and which is capable of forming a strip material that is inexpensive and yet of high quality, and an apparatus for the same.

The object can be achieved first, by a method for preparing a strip material comprising steps of:

holding, by means of a transfer means, the forward end of a second strip supported from the lower side while being permitted free movement in the longitudinal direction by a supporting means, causing the transfer means to extend ahead toward a joining position on a transfer conveyor located directly below the supporting means and thereby transferring the forward end of the second strip to the joining position while drawing the second strip from the supporting means to shift the second strip in the lengthwise direction by a predetermined amount relative to a first strip supported from the lower side by the transfer conveyor, and pressing the first and second strips against the transfer conveyor by means of a joining means while drawing and transferring forward the first and second strips by the transfer conveyor, thereby joining the first and second strips one upon the other to form a strip material, and second, by an apparatus for preparing a strip material comprising:

a transfer conveyor extending in the longitudinal direction and capable of transferring a first strip forward while supporting the first strip from the lower side, a supporting means located directly above the transfer conveyor and extending in the longitudinal direction and capable of supporting a second strip from the lower side while permitting free movement of the second strip in the longitudinal direction, a transfer means for extending ahead toward a joining position on the transfer conveyor with the forward end of the second strip held by the transfer means and thereby transferring forward the forward end of the second strip to the joining position while drawing the second strip from the supporting means to shift the second strip relative to the first strip in the lengthwise direction by a predetermined amount, and a joining means for pressing the first and second strips shifted from each other in the lengthwise direction by the predetermined amount against the transfer conveyor, thereby joining the first and second strips one upon the other to form a strip material.

It is now supposed that the first strip is supported from the lower side by the transfer conveyor and the second strip is supported from the lower side while being permitted free movement in the longitudinal direction by the supporting means located directly above the transfer conveyor. Then, the forward end of the second strip is held by the transfer means, and the transfer means is then caused to advance toward the joining position on the transfer conveyor. Hereupon, since the second strip is supported from the lower side while being permitted free movement in the longitudinal direction by the supporting means as described above, the second strip is readily drawn from the supporting means while being moved on the supporting means forward. When the forward end of the second strip is transferred to the joining position in this manner, a shift by a predetermined amount in the lengthwise direction is provided between the second strip and the first strip. Then, upon actuation of the transfer conveyor, the second strip is transferred forward while being drawn from the supporting means, and at the same time, the first strip is also transferred forward. At this time, the first and second strips shifted from each other in the lengthwise direction by the predetermined amount are pressed against the transfer conveyor by means of the joining means, thereby joining the first and second strips one on the other to form a strip material. It is to be noted that, during the joining operation as described above, the second strip is pulled by the transfer conveyor and thereby drawn from the supporting means and then fed to the transfer conveyor, and by virtue of this, the feed rate of the second strip is identical to the traveling speed of the transfer conveyor, i.e., the transfer speed of the first strip. In consequence, the second strip is joined with the first strip one on the other without undergoing tension or contraction, thus leading to enhanced quality of the resulting strip material. In addition, since the transfer means and the transfer conveyor are required to be controlled only in timing of actuation, a controlling means therefor may be simple. Accordingly, a simplified constitution can be attained and a strip material can be produced economically.

Moreover, the transfer conveyor and the feed conveyor preferably located one above the other, and hence, the length of the apparatus as a whole can be reduced.

DESCRIPTION OF THE PREFERRED EMBODIMENT

Now, an embodiment of the present invention will be described with reference to the accompanying drawings.

Figure 1:
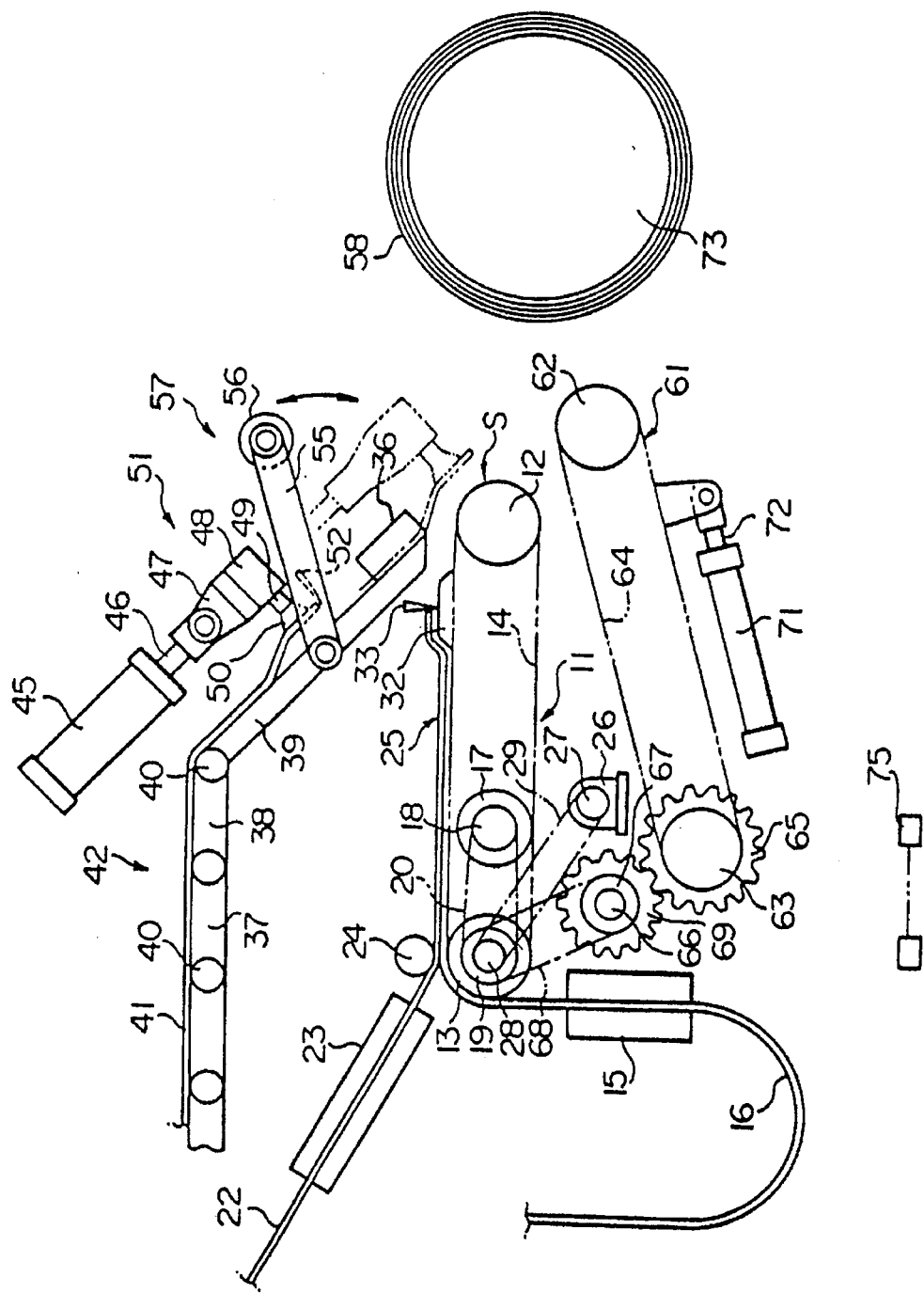
FIG. 1 is a schematic front view showing one embodiment of the present invention.
Figure 2:
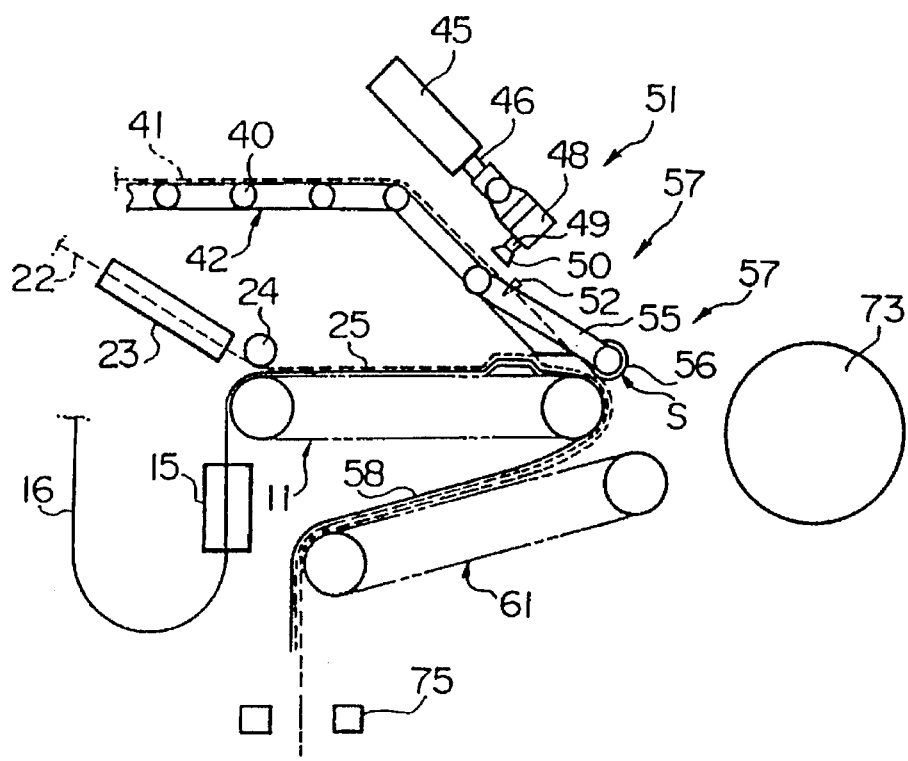
FIG. 2 is an illustrative view illustrating operation of the embodiment.

In FIG. 1, reference numeral 11 represents a transfer conveyor supported by a frame (not shown) and horizontally extending in the longitudinal direction, and the transfer conveyor 11 has a pair of pulleys 12, 13 spaced in the longitudinal direction and a belt 14 looped around the pulleys 12, 13. Reference numeral 15 represents a centering means located just below the pulley 13, and the centering means 15 performs centering of a first ply 16, such as a continuous strip of inner liner, which constitutes a festoon immediately prior to being fed to the transfer conveyor 11. Reference numeral 17 represents a motor with a brake, which is mounted on the unshown frame as a driving means, and around a pulley 18 fixedly attached to the output shaft of the motor 17 and a pulley 19 attached to the pulley 13, a belt 20 is looped. Behind and slightly above the pulley 13 is located a slant centering means 23, and the centering means 23 performs centering of a second ply 22, such as a continuous strip of chafer, just prior to being fed to the transfer conveyor 11. Reference numeral 24 represents a rotatable joining roller located directly above the pulley 13, and the joining roller 24 presses the first and second plies 16, 22 fed to the transfer conveyor 11 to be confluent against the pulley 13 to join one upon the other, thereby forming a first strip 25 with the first ply 16 on the lower side and the second ply 22 on the upper side. When the motor 17 is actuated to cause the belt 14 to travel, the thus formed first strip 25 is transferred forward while being supported from the lower side by the belt 14. Reference numeral 26 represents an encoder which measures amount of the travel of the transfer conveyor 11 (amount of feed), and around a pulley 27 attached to the encoder 26 and a pulley 28 fixedly attached to the pulley 13, a belt 29 is looped. Reference numeral 32 represents an anvil formed near the forward end of the transfer conveyor 11, the anvil 32 extends in the crosswise direction of the first strip 25. When the first strip 25 is transferred forward by the transfer conveyor 11, the first strip 25 passes over the anvil 32. Reference numeral 33 represents a first cutter located directly above the anvil 32, and the first cutter 33 cuts the first strip 25 crosswise at a cutting position in cooperation with the anvil 32, when transfer of the first strip 25 is stopped.

Reference numeral 37 represents a supporting frame located directly above the transfer conveyor 11 and extending in the longitudinal direction, and the supporting frame 37 has a horizontal portion 38 and a slant portion 39 extending from the forward end of the horizontal portion 38 to a position in the vicinity of the pulley 12 and slanting down forward. At the forward end of the slant portion 39, a centering means 36 is located which performs centering of a second strip 41 such as a continuous strip of carcass ply. In the horizontal portion 38, a plurality of free rollers 40 are rotatably supported, and the free rollers 40 are spaced apart in the longitudinal direction. The second strip 41 is supported from the lower side while being permitted free movement in the longitudinal direction by a supporting means 42 comprising the supporting frame 37 and the free rollers 40.

Directly above the forward portion of the supporting frame 37 is located a cylinder 45 extending along the slant portion 39, and on the distal end of a piston rod 46 of the cylinder 45 is mounted a cylinder 48 perpendicular to the cylinder 45 via a bracket 47. On the distal end of a piston rod 49 are mounted a plurality of vacuum pads 50 connected to a vacuum source (not shown) via a selector valve, and the vacuum pads 50 are capable of suctionally holding the forward end of the second strip 41. When the cylinder 45 is actuated to cause the piston rod 46 to extend with the forward end of the second strip 41 held by the vacuum pads 50, the vacuum pads 50 are moved forward to a position in the vicinity of a joining position S in the transfer conveyor 11, i.e., in the vicinity of the circumference of the pulley 12. Consequently, the second strip 41 is drawn from the supporting means 42 and the forward end thereof is transferred to the joining point S. When the forward end of the second strip 41 is transferred to the joining point S in this manner, the second strip 41 is shifted by a predetermined amount in the lengthwise direction relative to the first strip 25. The reason for providing such a shift between the first strip 25 and the second strip 41 is that when the first and second strips 25, 41 are wound on a shaping drum described below, a shift in the circumferential direction is formed at each of the joint portions between the forward ends and between the rear ends of the first and second strips 25, 41 so as to improve uniformity of the resulting tire. The cylinder 48 and the vacuum pads 50 as a whole constitute a transfer means 51 for transferring forward the forward end of the second strip 41 toward the joining position S on the transfer conveyor 11 with the forward end held by the transfer means to thereby transfer the forward end to the joining position S while drawing the second strip 41 from the supporting means 42, thereby shifting the second strip 41 in the lengthwise direction by the predetermined amount relative to the first strip 25. Reference numeral 52 represents a second cutter located midway of the slant portion 39, and the second cutter 52 cuts the second strip 41 crosswise at a cutting position, when transfer of the second strip 41 is stopped.

Reference numeral 55 represents a swing arm having its pivotal end swingably supported by the unshown frame, and at the forward end of the swing arm 55, a joining roller 56 parallel to the pulley 12 is rotatably supported. When the swing arm 55 is caused to swing downward by a swinging mechanism (not shown) such as a cylinder, the joining roller 56 presses the first and second strips 25, 41 against the pulley 12 of the transfer conveyor 11 to join the first and second strips 25, 41 one on the other. The swing arm 55, the swinging mechanism and the joining roller 56 as a whole constitute a joining means 57 for joining the first and second strips 25, 41 one on the other by pressing the first and second strips 25, 41 shifted by a predetermined amount in the lengthwise direction against the transfer conveyor 11 to form a strip material 58.

Directly below the transfer conveyor 11 is located a feed conveyor 61 extending in the longitudinal direction, the feed conveyor 61 is linearly movable in the longitudinal direction. The feed conveyor 61 has pulleys 62, 63 parallel to the pulley 12 and spaced apart in the longitudinal direction and a belt 64 looped around the pulleys 62, 63, and an external gear 65 is mounted on the pulley 63. As described above, the transfer conveyor 11 and the feed conveyor 61 are located one above the other in general (when the feed conveyor 61 is in the retracted terminal). Accordingly, the overall length of the apparatus as a whole may be reduced. The forward end of the feed conveyor 61 is located ahead of the forward end of the transfer conveyor 11. Reference numeral 66 represents a rotating shaft rotatably supported by the unshown frame, and around a pulley 67 fixedly mounted on the rotating shaft 66 and a pulley 19, a belt 68 is looped. On the rotating shaft 66 is mounted an external gear 69, and the external gear 69 is in mesh with the external gear 65 when the feed conveyor 61 is in the retracted terminal. In consequence, the feed conveyor 61 receives driving force from the transfer conveyor 11 to travel when it is in the retracted terminal, thereby enabling the strip material 58 delivered from the forward end of the transfer conveyor 11 to be transferred in the longitudinal direction to-and-fro while being supported from the lower side. Directly below the feed conveyor 61 is located a cylinder 71 extending along the feed conveyor 61 as a transfer means, and the forward end of a piston rod 72 of the cylinder 71 is connected to the feed conveyor 61. Consequently, when the cylinder 71 is actuated to cause the piston rod 72 to extend, the feed conveyor 61 is linearly moved toward the shaping drum 73 located in front thereof. When feed conveyor 61 is moved forward, the external gear 69 and the external gear 65 become out of mesh. When the feed conveyor 61 is moved to the advanced terminal and thereby the pulley 62 is pressed against the shaping drum 73, the feed conveyor 61 travels forward as the shaping drum 73 rotates. Consequently, the strip material 58 supported by the feed conveyor 61 is fed to the shaping drum 73 and wound on the circumference of the shaping drum 73. Reference numeral 75 represents a sensor located below the pulley 63, the sensor 75 detects one end of the strip material 58 dangling from the rear end of the feed conveyor 61.

In the next place, operation of the one embodiment of the present invention will be described.

It is now supposed that the first strip 25 is supported from the lower side by the transfer conveyor 11 and the second strip 41 is supported from the lower side while being permitted free movement in the longitudinal direction by the supporting means 42, as shown in FIG. 1. At this time, the forward end of the second strip 41 is kept apart from the slant portion 39 while being suctionally held by the vacuum pads 50, and the swing arm 55 is kept swung up. Then, the cylinder 45 is actuated to cause the piston rod 46 to extend, thereby moving the vacuum pads 50 forward to the joining position S. Hereupon, since the second strip 41 is supported from the lower side while being permitted free movement in the longitudinal direction by the supporting means 42, the second strip 41 is drawn from the supporting means 42 while being moved on the supporting means 42 forward. When the vacuum pads 50 reaches a position in the vicinity of the joining position S as shown in phantom in FIG. 1, the operation of the cylinder 45 is stopped. Then, the piston rod 49 of the cylinder 48 is caused to extend to transfer the forward end of the second strip 41 to the joining position S. Thereafter, the vacuum pads 50 are disconnected from the vacuum source (or connected to a compressed air source according to need) by switching the selector valve to deliver the forward end of the second strip 41 from the transfer means 51 to the transfer conveyor 11. When the second strip 41 is drawn while being subjected to centering by the centering means 36 and the forward end thereof is transferred to the joining position S, a shift by a predetermined amount in the lengthwise direction is provided between the forward end of the second strip 41 and the forward end of the first strip 25. In this case, the forward end of the second strip 41 is positioned ahead of the forward end of the first strip 25 and apart therefrom by a predetermined amount. Then, the piston rod 49 of the cylinder 48 is retracted to cause the vacuum pads 50 retire from the second strip 41, and the piston rod 46 of the cylinder 45 is then retracted to return the vacuum pads 50 to the initial position.

Then, a cylinder is actuated to swing the swing arm 55 downward to press the joining roller 56 against the joining position S (the pulley 12) of the transfer conveyor 11 via the forward end of the second strip 41. Thereafter, when the motor 17 is actuated to rotate the pulley 13, the transfer conveyor 11 is actuated to cause the belt to travel forward. Hereupon, the second strip 41 having its forward end delivered to the transfer conveyor 11 is transferred forward while being drawn from the supporting means 42. In parallel with this, the first and second plies 16, 22 are subjected to centering by the centering means 15, 23, respectively, and then caused to meet together on the pulley 13 and pressed against the pulley 13 by the joining roller 24, thereby being joined one on the other to form the first strip 25. The thus formed first strip 25 is also transferred forward by the travel of the transfer conveyor 11. Upon arrival of the forward end of the first strip 25 at the joining position S, the first and second strips 25, 41 shifted with each other by a predetermined amount in the lengthwise direction are pressed against the pulley of the transfer conveyor 11 by the joining roller 56, thereby being joined one on the other to form the strip material 58 with the first strip 25 on the lower side and the second strip 41 on the upper side. It is to be noted that, during the joining operation as described above, the second strip 41 is pulled by the transfer conveyor 11 and thereby drawn from the supporting means 42 and then fed to the transfer conveyor 11, and by virtue of this, the feed rate of the second strip 41 is identical to the traveling speed of the belt 14 of the transfer conveyor 11, i.e., the transfer speed of the first strip 25. In consequence, the second strip 41 is joined with the first strip 25 one on the other without undergoing tension or contraction, thus leading to enhanced quality of the resulting strip material 58. In addition, since the transfer means 51 (cylinder 48) and the transfer conveyor 11 (motor 17) are required to be controlled only in timing of actuation, a controlling means therefor may be simple. Accordingly, a simplified constitution may be attained and a strip material can be produced economically. Concurrently, the feed conveyor 61 receives the driving force of the motor 17 via the pulley 19, the belt 68, the pulley 67 and the external gears 69, 65 to travel synchronously with the transfer conveyor 11 in the backward direction as opposed to the transfer conveyor 11. The thus formed strip material 58 then leaves the forward end of the transfer conveyor 11 and dangles therefrom. In this connection, as described above, the forward end of the feed conveyor 61 is located ahead of the forward end of the transfer conveyor 11. Accordingly, the strip material 58 descends onto the feed conveyor 61 and is transferred backward in upside-down condition while being supported from the lower side by the feed conveyor 61.

When one end of the strip material 58 dangles from the rear end of the feed conveyor 61, the sensor 75 detects the one end of the strip material 58 (the forward end) of the second strip 41. After the detection by the sensor 75, the strip material 58 is further transferred by a predetermined amount. Hereupon, the operation of the motor 17 is stopped to stop the travels of the transfer conveyor 11 and the feed conveyor 61. Then, the cylinder 48 of the transfer means 51 is actuated to cause the piston rod 49 to extend, thereby pressing the vacuum pads 50 against the second strip 41 at a position immediately behind the second cutter 52. Thereafter, the selector valve is switched to connect the vacuum pads 50 to the vacuum source, thereby causing the vacuum pads 50 to suctionally hold the second strip 41. Then, the second strip 41 is cut crosswise by the cutter 52 at the cutting position. Consequently, the portion of the second strip 41 which has been formed into the strip material 58 is cut from the continuous second strip 41 in a predetermined length. On the other hand, it follows that the vacuum pads 50 hold the forward end of the continuous second strip 41. Then, the piston rod 49 of the piston 48 is retracted to bring the forward end of the second strip 41 apart from the supporting means 42, more specifically, from the slant portion 39.

Figure 3:
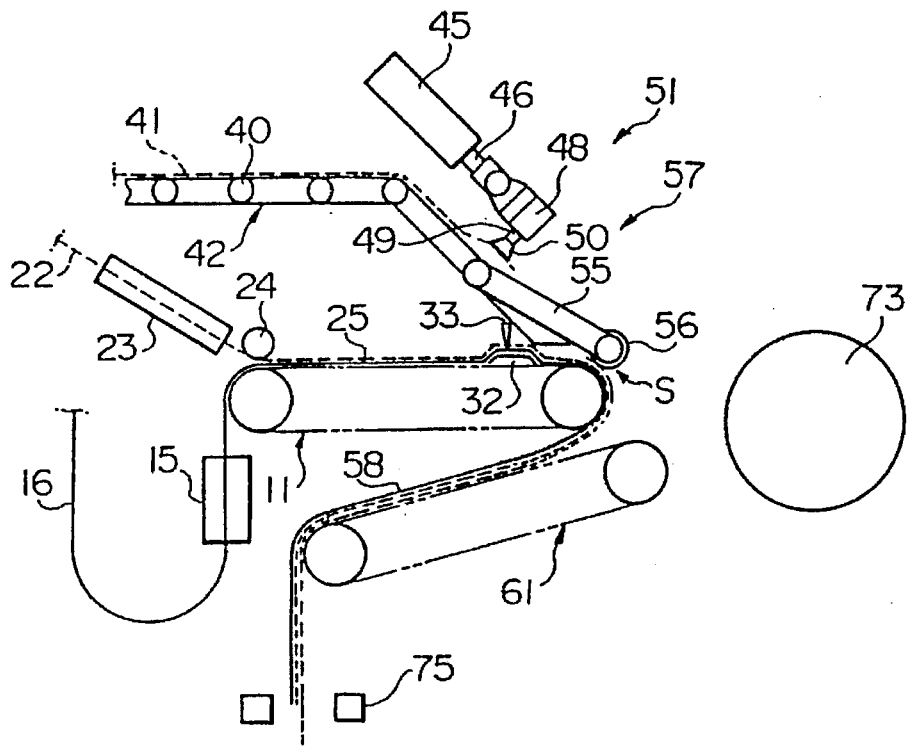
FIG. 3 is an illustrative view illustrating operation of the embodiment.

Then, the motor 17 is actuated again to cause the transfer conveyor 11 and the feed conveyor 61 to travel by a predetermined amount forward and backward, respectively, thereby transferring the first strip 25 and the formed strip material 58 forward and backward, respectively. When the travels of the transfer and feed conveyors 11, 61 are stopped, the first strip 25 is cut crosswise at the cutting position by means of the first cutter 33 and the anvil 32, as shown in FIG. 3, to completely separate the strip material 58 from the first and second strips 25, 41. Then, the swing arm 55 is swung upward to cause the joining roller 56 to retire from the joining position S to the initial position.

Figure 4:
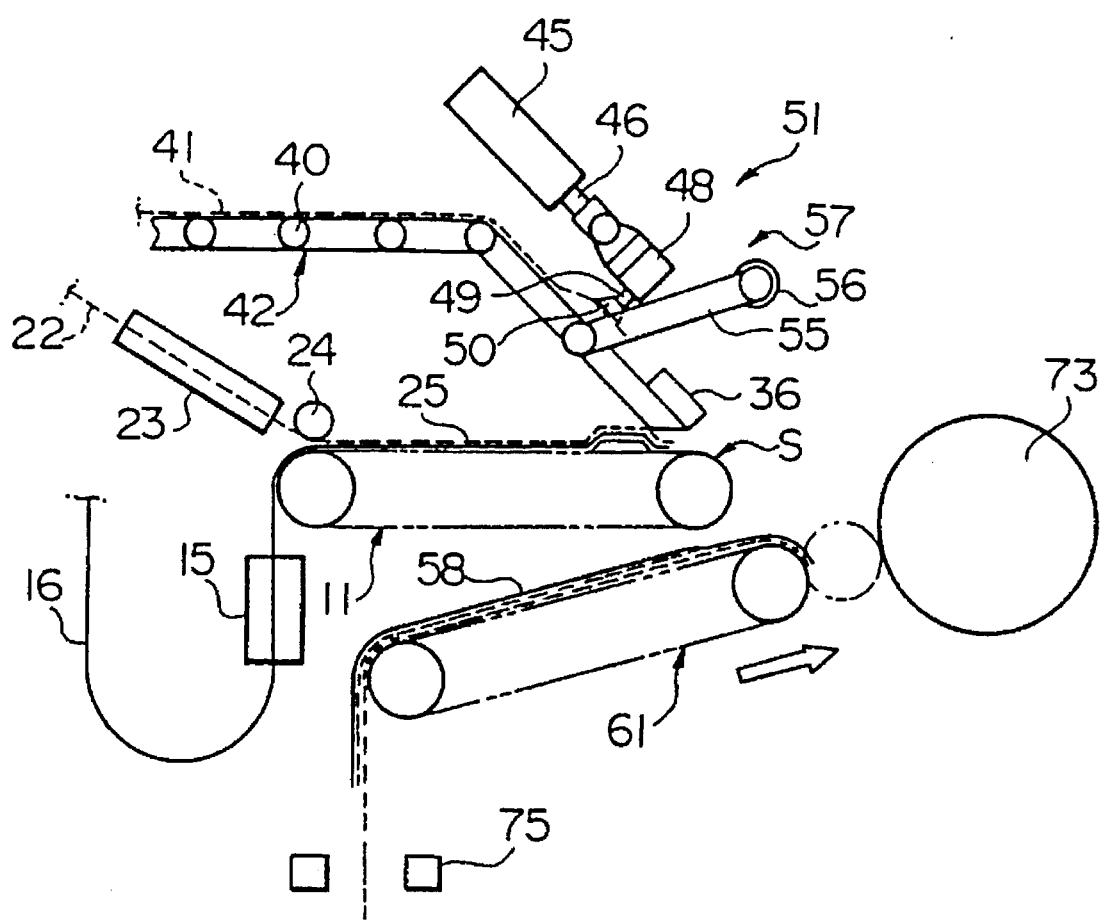
FIG. 4 is an illustrative view illustrating operation of the embodiment.

Then, the motor 17 is actuated once more to cause the transfer conveyor 11 and the feed conveyor 61 to travel by a predetermined amount forward and backward, respectively. In consequence of this, the first strip 25 is transferred forward, whereas the rear end of the strip material 58 separated therefrom is released from the forward end of the transfer conveyor 11 to cause the strip material 58 to alight upon the feed conveyor 61. Consequently, the entire strip material 58 is transferred to the feed conveyor 61 and supported from the lower side by the feed conveyor 61. Then, the motor 17 is actuated in reverse to the above to cause the transfer conveyor 11 and the feed conveyor 61 to travel by a predetermined amount backward and forward, respectively, thereby transferring the strip material 58 until the forward end of the strip material 58 arrives at a position in the vicinity of the straight line connecting the rotating shaft of the pulley 62 with the rotating shaft of the shaping roller 73. This position is shown in FIG. 4.

Then, the piston rod 72 of the cylinder 71 is caused to extend to linearly advance the feed conveyor 61 toward the shaping drum 73. When the feed conveyor 61 arrives at the advanced terminal to hold the forward end of the strip material 58 between the pulley 62 and the shaping drum 73, the movement of the feed conveyor 61 is stopped. In this condition, the external gear 65 is disengaged from the external gear 69 to be out of mesh, and consequently, the belt 64 is able to travel freely. Thereafter, when the shaping drum 73 is rotated, the feed conveyor 61 receives driving force from the shaping drum 73 to travel forward, and the strip material 58 on the feed conveyor 61 is thereby fed to the shaping drum 73 and wound on the circumference of the shaping drum 73 while being transferred thereto. When the full length of the strip material 58 is wound on the shaping drum 73, the rotation of the shaping drum 73 is stopped. During the winding on the shaping drum 73, the motor 17 is actuated to cause the transfer conveyor 11 to travel backward by a predetermined amount, thereby returning the forward end of the first strip 25 to a predetermined position. Then, by retracting the piston rod 72 of the cylinder 71, the feed conveyor 61 is moved backward to return to the initial position and the external gears 65, 69 are brought into mesh with each other. The above procedure is one cycle of operation of the one embodiment according to the present invention. This cycle is repeated so that strip materials 58 are successively formed and fed to the shaping drum 73.

In the above-described embodiment, the supporting member 42 comprises the supporting frame 37 and the free rollers 40. In the present invention, however, the supporting member may be an air table, i.e., a table by which the second strip 41 is caused to float by jetting air upward from a large number of air jet ports and thereby supported from the lower side. Further, in the present invention, a shift between the first and second strips in the lengthwise direction may be provided in such a manner that the forward end of the second strip is transferred to the joining position and the forward end of the first strip is then positioned in advance of the forward end of the second strip.

As described above, according to the present invention, by virtue of its simple constitution, a strip material can be prepared which is inexpensive and yet of high quality.

What is claimed is:

1. A method for preparing a laminated strip material comprising the steps of:

holding, by means of a transfer means, the forward end of a second strip supported from its lower side while being permitted free movement in the longitudinal direction by a supporting means, causing the transfer means to extend ahead toward a joining position on a transfer conveyor located directly below the supporting means and thereby transferring the forward end of the second strip to the joining position while drawing the second strip from the supporting means to shift the second strip in the lengthwise direction by a predetermined amount relative to a first strip supported from its lower side by the transfer conveyor, and pressing the first and second strips against the transfer conveyor by means of a joining means while drawing and transferring forward the first and second strips by the transfer conveyor, thereby joining the first and second strips one upon the other to form a laminated strip material.

2. An apparatus for preparing a laminated strip material comprising:

a transfer conveyor extending in the longitudinal direction and capable of transferring a first strip forward while supporting the first strip from its lower side, a supporting means located directly above the transfer conveyor and extending in the longitudinal direction and capable of supporting a second strip from its lower side while permitting free movement of the second strip in the longitudinal direction, a transfer means for extending toward a joining position on the transfer conveyor with the forward end of the second strip held by the transfer means and thereby transferring forward the forward end of the second strip to the joining position while drawing the second strip from the supporting means to shift the second strip relative to the first strip in the lengthwise direction by a predetermined amount, and a joining means for pressing the first and second strips against the transfer conveyor while drawing and transferring forward the first and second strips by the transfer conveyor, thereby joining the first and second strips one upon the other to form a laminated strip material.

3. The apparatus for preparing a strip material according to claim 2, the apparatus further comprising:

a feed conveyor located directly bellow the transfer conveyor and extending in the longitudial direction and capable of transferring the strip material delivered from the forward end of the transfer conveyor in the longitudinal direction to-and-fro while supporting the strip material from its lower side, and a carrying means for moving the feed conveyor supporting the strip material toward a shaping drum located in front of the feed conveyor, wherein upon arrival of the feed conveyor at its advanced position, the strip material is fed to the shaping drum and wound on the circumference of the shaping drum by rotation of the shaping drum and forward travel of the feed conveyor.

* * * * *